US006922718B2

(12) United States Patent
Chang

(10) Patent No.: US 6,922,718 B2
(45) Date of Patent: Jul. 26, 2005

(54) METHOD AND SYSTEM FOR PARTICIPATING LOCATIONS IN A MULTI-POINT VIDEO CONFERENCE

(75) Inventor: Luke L. Chang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 727 days.

(21) Appl. No.: 10/061,400

(22) Filed: Feb. 1, 2002

(65) Prior Publication Data
US 2003/0149724 A1 Aug. 7, 2003

(51) Int. Cl.[7] .............................................. G06F 15/16
(52) U.S. Cl. ...................... 709/204; 709/205; 709/213; 709/216; 715/526; 715/517
(58) Field of Search ................................. 709/204, 205, 709/213, 216; 715/526, 517

(56) References Cited

U.S. PATENT DOCUMENTS

| | | | |
|---|---|---|---|
| 4,531,024 A | 7/1985 | Colton et al. .................. 179/2 |
| 4,677,466 A | 6/1987 | Lert, Jr. et al. ............... 358/84 |
| 5,402,418 A | 3/1995 | Shibata et al. ................ 370/62 |
| 5,477,546 A | 12/1995 | Shibata et al. ................ 370/62 |
| 5,799,041 A | 8/1998 | Szkopek et al. ............. 375/259 |
| 5,808,663 A | 9/1998 | Okaya ......................... 348/15 |
| 5,818,513 A | 10/1998 | Sano et al. ................... 348/15 |
| 5,818,514 A | 10/1998 | Duttweiler et al. ........... 348/15 |
| 5,841,763 A | 11/1998 | Leondires et al. .......... 370/260 |
| 5,878,221 A | 3/1999 | Szkopek et al. ........ 395/200.48 |
| 5,920,693 A | 7/1999 | Burkman et al. ...... 395/200.34 |
| 5,929,921 A | 7/1999 | Taniguchi et al. .......... 348/484 |
| 5,963,246 A | 10/1999 | Kato ........................... 348/15 |
| 6,100,918 A | 8/2000 | Lu .............................. 348/15 |
| 6,122,259 A | 9/2000 | Ishida ........................ 370/260 |
| 6,141,317 A | 10/2000 | Marchok et al. ............ 370/208 |
| 6,211,902 B1 | 4/2001 | Tanoi ...................... 348/14.09 |
| 6,226,686 B1 | 5/2001 | Rothschild et al. ......... 709/245 |
| 6,292,204 B1 | 9/2001 | Carleton et al. ............ 345/753 |

Primary Examiner—William A. Cuchlinski, Jr.
Assistant Examiner—Thanh T. Nguyen
(74) Attorney, Agent, or Firm—Hamilton & Terrile, LLP; Stephen A. Terrile

(57) ABSTRACT

A multi-point video conferencing system and method for managing display of images of multiple participating locations and bandwidth allocated for a multi-point video conference. The multi-point video conferencing system detects an audio signal associated with an image not currently displayed to each participating location in the multi-point video conference. When the number of active display windows is less than the maximum number of active display windows, a first active display window is activated and the image displayed in the first active display window. When the number of the active display windows is not less than the maximum number, a second active display window of the active display windows is inactivated, a third active display window is activated, and the image is displayed in the third active display window.

45 Claims, 3 Drawing Sheets

METHOD AND SYSTEM FOR PARTICIPATING LOCATIONS IN A MULTI-POINT VIDEO CONFERENCE

BACKGROUND OF THE INVENTION

As the value and use of information increases, individuals and businesses seek additional ways to process and store information. One option available to these individuals and businesses is to use information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In today's business environment, video conferences provide the ability for persons at different locations to communicate without the need to travel to a common location to attend a meeting. A video conference which allows communication between multiple locations in a single video conference is referred to as a multi-point video conference. A multi-point video conferencing system may be thought of as one or more information handling systems supporting multi-point video conferences.

In a typical multi-point video conferencing system, each participating location has a video conference terminal. Video conference terminals typically are equipped with video cameras, video displays, audio microphones and audio speakers. This equipment allows the video conference participants to see and speak with each other, as though they were present at a single conference table in a single room. In addition, the video cameras and displays allow a participant to present materials of interest to the other participants, such as documents and physical objects, as though making a live, personal presentation. Each video conference terminal may be observed by one or more participants at the participating location.

Some video conferencing systems display a single image of a single participant (usually the person currently speaking) to the other participants. Other video conferencing systems provide a "split screen" presentation with multiple display windows on a single screen, where each display window displays an image of a different participant. Such an implementation allows participating locations without specialized video conferencing display equipment to use a standard computer monitor for displaying the images. Still other video conferencing systems allow multiple images to be presented on multiple screens, which may require specialized video display equipment.

Preferably, a multi-point video conference provides every participating location with access to all available speech, video and data coming from all other participating locations. However, "continuous-presence" multi-point conferencing is usually not feasible because it requires bandwidth for linking each participating location to every other participating location. Real-time audio and video data streams require tremendous bandwidth to communicate quality, synchronized sound and images from one location to another. In a multi-point video conference, bandwidth requirements are even larger, particularly when multiple participants are to be displayed requiring processing of multiple video streams. The more video streams that must be processed, the higher the bandwidth required to achieve quality sound and images (e.g. good frame rate, large enough frame size, etc.). Bandwidth allocation and management for a video conference directly affects the quality of the participants' experience.

Fast switching provides an alternative to continuous presence. Video and data information are provided selectively using criteria for determining which participating locations should be displayed and which should be heard. Selection can be made by a human facilitator of the video conference or fully automatically.

In video conferencing systems that display a single image, several schemes are used to determine which participating location's image should be displayed. One technique is to use the audio volume to decide which one image to display (i.e., the loudest wins). Another technique involves a "talker and graphic contention resolution process" to display only one talker's (participating location's) image based upon an algorithm which selects only one talker and only one graphic image. However, single image displays are less effective in highly interactive conferences than they are in a lecture-style video conference.

A technique applicable for displaying either a single image or multiple images of participating locations includes using an audio signal detection method at the audio input device (microphone) to decide whether to send video or not based on presence of an audio signal. However, this technique has shortcomings in terms of fairness; for example, the speaker that speaks the most often can monopolize a portion or all of the video display (as well as the bandwidth) for the conference, allowing other participants little opportunity to be seen. Furthermore, a resolution process is necessary to determine which speakers are to be displayed when more audio signals than display windows exist. Often the resolution process involves the "loudest wins" technique described above.

What is needed is a solution that provides the ability to manage bandwidth allocated and images presented in multiple display windows for a multi-point video conference. The solution should provide fair coverage of all participating locations in an interactive discussion and minimize the bandwidth necessary to conduct the video conference. The solution should also maintain high quality, synchronized sound and images. Preferably, the solution should not require specialized equipment at each participating location to view images for the video conference.

SUMMARY OF THE INVENTION

The present invention provides a multi-point video conferencing system and method for managing the display of images of multiple participating locations and bandwidth allocated for a multi-point video conference.

In one form of the invention, a method includes detecting an audio signal corresponding to a first participating location of a plurality of participating locations in a multi-point video conference. The first participating location has no corresponding active display window, and the first participating location corresponds to an image. When the number of active display windows is less than the maximum number of active display windows, a first active display window is activated and the image displayed in the first active display window. When the number of the active display windows is not less than the maximum number, a second active display window of the active display windows is inactivated, a third active display window is activated, and the image is displayed in the third active display window.

In another form of the invention, a method includes detecting a change in audio status corresponding to a first participating location of a plurality of participating locations in a multipoint video conference. When the change in audio status is from silent to audible, and when a number of active display windows is less than a maximum number of the active display windows, the method includes activating a first active display window, starting a first display timer corresponding to the first active display window, and displaying the image in the first active display window to each participating location. When the change in audio status is from silent to audible, and when the number of active display windows is not less than the maximum number, the method further includes inactivating a second active display window, stopping a second display timer corresponding to the second active display window, activating a third active display window, starting a third display timer corresponding to the third active display window; and displaying the image in the third active display window to each participating location. When the change in audio status is from audible to silent, the method further includes starting a first silence timer corresponding to the first participating location.

In another form of the invention, a multi-point video conferencing system includes a video display decision-making module to determine a display window for displaying an image to a set of participating locations in a multi-point video conference. The multi-point video conferencing system further includes a multi-point control unit configured to provide communication between the video display decision-making module and a plurality of display devices, wherein each display device of the display devices corresponds to a respective participating location of the set of participating locations.

The present invention also includes a system, an information handling system, and a computer program product implementing the steps of the above methods.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
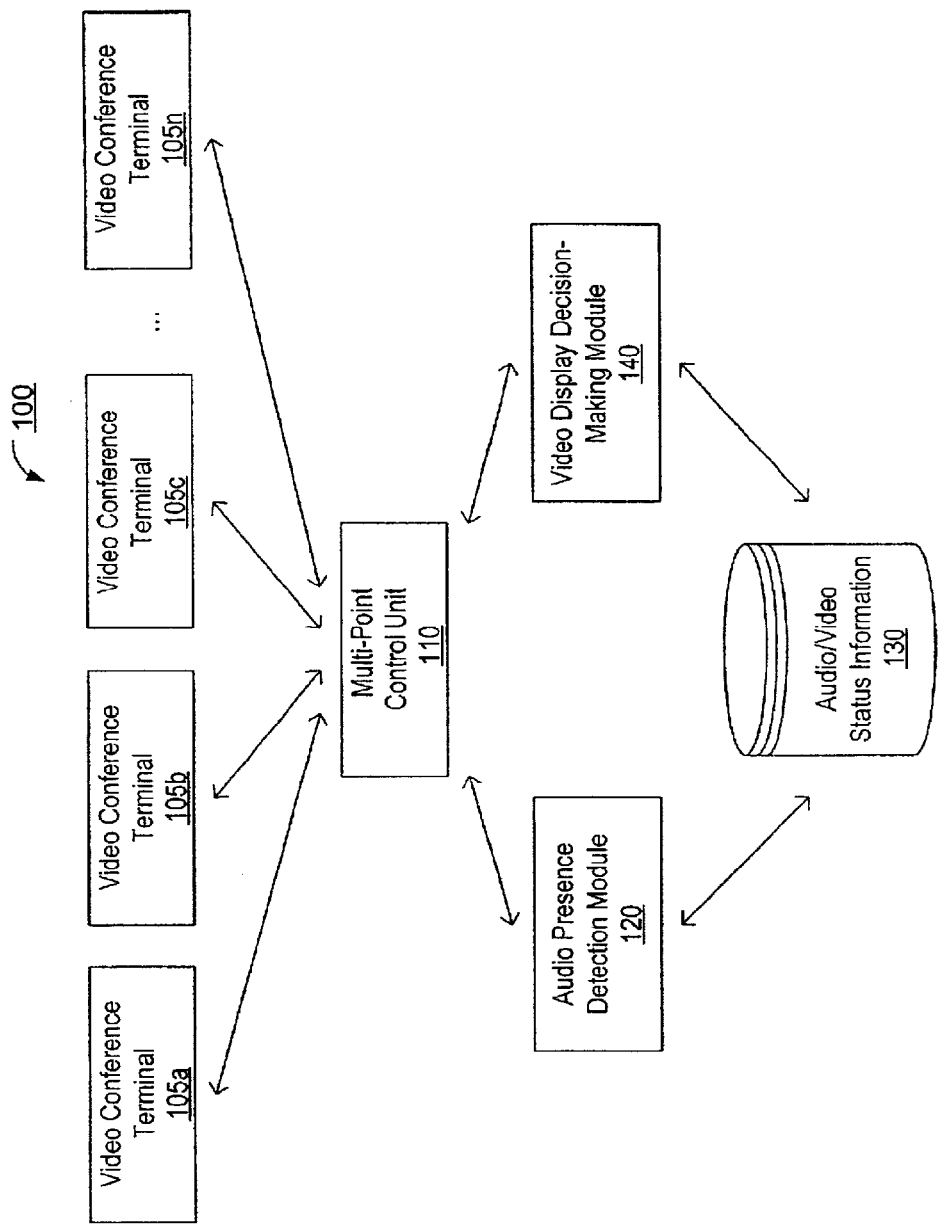
FIG. 1 is a diagram of an embodiment of the multi-point video conferencing system of the present invention.

FIG. 1 shows an example of an embodiment of a multi-point video conferencing system 100 including an multi-point control unit (MCU) 110. In the example shown, each of video conference terminals 105a, 105b, 105c and 105n represents a participating location in the video conference. The number of participating locations in a multi-point video conference can be from one (upon initial set-up of the video conference) to many at any given point in time, although the invention is designed to operate in a highly interactive environment in which three or more participating locations are involved in an interactive discussion. In this environment, an image from each of the participating locations (up to a maximum number determined by the display capabilities of the participating locations) is displayed simultaneously to all participating locations.

Prior to the multi-point video conference, MCU 110 determines a maximum number of active display windows that can be displayed based on a preset bandwidth limit, which is determined by MCU 110 and a gatekeeper (not shown), and display window size.

Video conferencing system 100 also includes an Audio Presence Detection Module 120, audio/video status information 130, and a video display decision-making module 140. Audio Presence Detection Module 120 corresponds to a software module or computer instructions that monitor incoming digitized audio signals from each participating location. Each audio signal is detected by a corresponding audio signal detecting device (not shown), such as a microphone, at each participating location. Preferably, the audio signal detecting devices detect only signals within a frequency range of the human voice. This feature prevents other loud noises, such as a door closing, from being broadcast to all participating locations in the video conference.

Audio/video status information 130 is updated whenever either the audio status (silent or audible) changes or whenever the video status (displayed or not displayed) changes. Furthermore, audio/video status information 130 may include information such as values of display timers, values of silence timers, and display priority. When a participating location has been designated as a priority location, an image from that participating location is continuously displayed. A video conference may have zero, one, or many priority locations. Preferably, fewer priority locations are designated than the maximum number of active display windows so that the video display images rotate among the participating locations. When a single participating location has priority, that participating location is often referred to as a host participating location. One of ordinary skill in the art will recognize that audio/video status information 130 need not be in a particular form and may correspond to a database table, to values of one or more variables in memory, to a file, or to other possible forms.

Video display decision-making module 140 uses audio/visual status information 130 to determine which images are transmitted for display to all participating locations in the video conference. For example, a host participating location often starts the video conference initially. The rest of the display windows can be initially allocated for the participating locations as these locations join the video conference. During the conference, video display decision-making module 140 determines which participating locations are allocated a display window.

A standard called H.323 enables a multi-point video conference using an IP-based network, such as the Internet, as the underlying communication mechanism. H.323 is an umbrella recommendation from the International Telecommunications Union (ITU) that sets standards for multimedia communications over LANs that do not provide a guaranteed Quality of Service (QoS). H.323 is part of a larger series of communications standards that enables videoconferencing across a range of networks. Known as H.32X, this series includes H.320 and H.324, which address integrated services digital network (ISDN) and public switched telephone network (PSTN) communications, respectively. H.323 references the T.120 specification for data conferencing and enables conferences which include a data capability.

By complying with H.323, multimedia products and applications from multiple vendors allow conference participants to communicate without concern for compatibility of the underlying networks. H.323 is used for local area network (LAN) products for consumer, business, entertainment, and professional applications.

Furthermore, H.323 provides platform and application independence because it is not tied to any hardware or operating system. H.323-compliant platforms include video-enabled personal computers, dedicated platforms, IP-enabled telephone handsets, cable TV set-top boxes and turnkey boxes.

H.323 can support conferences of three or more participating locations (endpoints) without requiring a specialized multi-point control unit (MCU), such as MCU 110. However, an MCU provides a powerful and flexible architecture for hosting multi-point conferences. Multipoint capabilities can be included in other components of an H.323 system.

Video and audio traffic is bandwidth-intensive and may interfere with other traffic on a corporate network. H.323 provides bandwidth management so that network managers can limit the number of simultaneous H.323 connections within their network or the amount of bandwidth available to H.323 applications. These limits ensure that critical traffic is not disrupted.

An H.323 conference can include participating locations (endpoints) with different capabilities. For example, a terminal with audio-only capabilities can participate in a conference with terminals that have video and/or data capabilities.

H.323 defines four major components for a network-based communications system: terminals, gateways, gatekeepers, and Multi-point Control Units (MCUs). Gateways are optional, and the functionality of gatekeepers can be included in an MCU. In the example of FIG. 1, video conference terminals 105a-105d are examples of terminals, the optional gateway is not included, and MCU 110 provides gatekeeper functionality.

Terminals are the client endpoints on the LAN that provide real-time, two-way communications. All terminals must support voice communications; video and data are optional.

The gateway is an optional element in an H.323 conference and is not shown in FIG. 1. Gateways provide many services, the most common being a translation function between H.323 conferencing endpoints and other terminal types. This function includes translation between transmission formats (i.e., H.225.0 to H.221) and between communications procedures (i.e., H.245 to H.242).

Gateways are not required if connections to other networks are not needed, since endpoints may directly communicate with other endpoints on the same network. No gateway is included in the example embodiment of FIG. 1, although other embodiments may include a separate gateway. Terminals communicate with gateways using the H.245 and Q.931 (for ISDN) protocols.

A gatekeeper is another component of an H.323 enabled network. The collection of all terminals, gateways, and Multi-point Control Units managed by a single gatekeeper is known as an H.323 Zone. The gatekeeper acts as the central point for all calls within its zone and provides call control services to registered endpoints. In many ways, an H.323 gatekeeper acts as a virtual switch.

Gatekeepers perform two important call control functions. The first is address translation from LAN aliases for terminals and gateways to IP or IPX addresses. The second function is bandwidth management. For instance, if a network manager has specified a threshold for the number of simultaneous conferences on the LAN, the gatekeeper can refuse to make any more connections once the threshold is reached. The effect is to limit the total conferencing bandwidth to some fraction of the total available; the remaining capacity is left for e-mail, file transfers, and other LAN protocols.

While a gatekeeper is logically separate from H.323 endpoints, vendors may incorporate gatekeeper functionality into the physical implementation of gateways and MCUs In the example shown in FIG. 1., gatekeeper functionality is provided by MCU 110. Other embodiments of the invention may include a separate gatekeeper.

The Multi-point Control Unit (MCU) supports conferences between three or more endpoints. Under H.323, an MCU includes a Multi-point Controller (MC), not shown in FIG. 1, and zero or more Multi-point Processors (MP), also not shown in FIG. 1. The multi-point controller handles H.245 negotiations between all terminals to determine common capabilities for audio and video processing. The multi-point controller also controls conference resources by determining which, if any, of the audio and video streams will be multicast.

The multi-point controller does not deal directly with any of the media streams. This is left to the multi-point processor, which mixes, switches, and processes audio, video, and/or data bits. Multi-point controller and multi-point processor capabilities can exist in a dedicated component or be part of other H.323 components.

Centralized multi-point video conferences require the existence of an MCU, such as MCU 110, to facilitate a multi-point video conference. All terminals such as video conference terminals 105a–105d of FIG. 1 send audio, video, data, and control streams to the MCU in a point-to-point fashion. The multi-point controller centrally manages the conference using H.245 control functions that also define the capabilities for each terminal. The multi-point processor does the audio mixing, data distribution, and video switching/ mixing functions typically performed in multi-point video conferences and sends the resulting audio/video streams back to the participating terminals. The multi-point processor may also provide conversion between different coder/decoders (codecs) and bit rates and may use multicast to distribute processed video. A typical MCU that supports centralized multi-point conferences consists of an multipoint controller and an audio, video, and/or data multi-point processor.

Decentralized multi-point conferences can make use of multicast technology. Participating H.323 terminals multicast audio and video to other participating terminals without sending the data to an MCU. Note that control of multi-point data is still centrally processed by the MCU, and H.245 control channel information is still transmitted in a point-to-point mode to an multi-point controller.

Receiving terminals such as video conference terminals 105a-105d of FIG. 1 are responsible for processing the multiple incoming audio and video streams. Terminals use H.245 control channels to indicate to an multi-point controller how many simultaneous video and audio streams they can decode. The number of simultaneous capabilities of one terminal does not limit the number of video or audio streams which are multicast in a conference. The multi-point processor can also provide video selection and audio mixing in a decentralized multi-point conference.

An multi-point controller may be located within a gatekeeper, gateway, terminal, or MCU. In the example of FIG. 1, a multi-point controller (not shown) is located within MCU 110.

The operation of each of the components of video conferencing system 100 is described in further detail with reference to FIG. 2.

Figure 2:
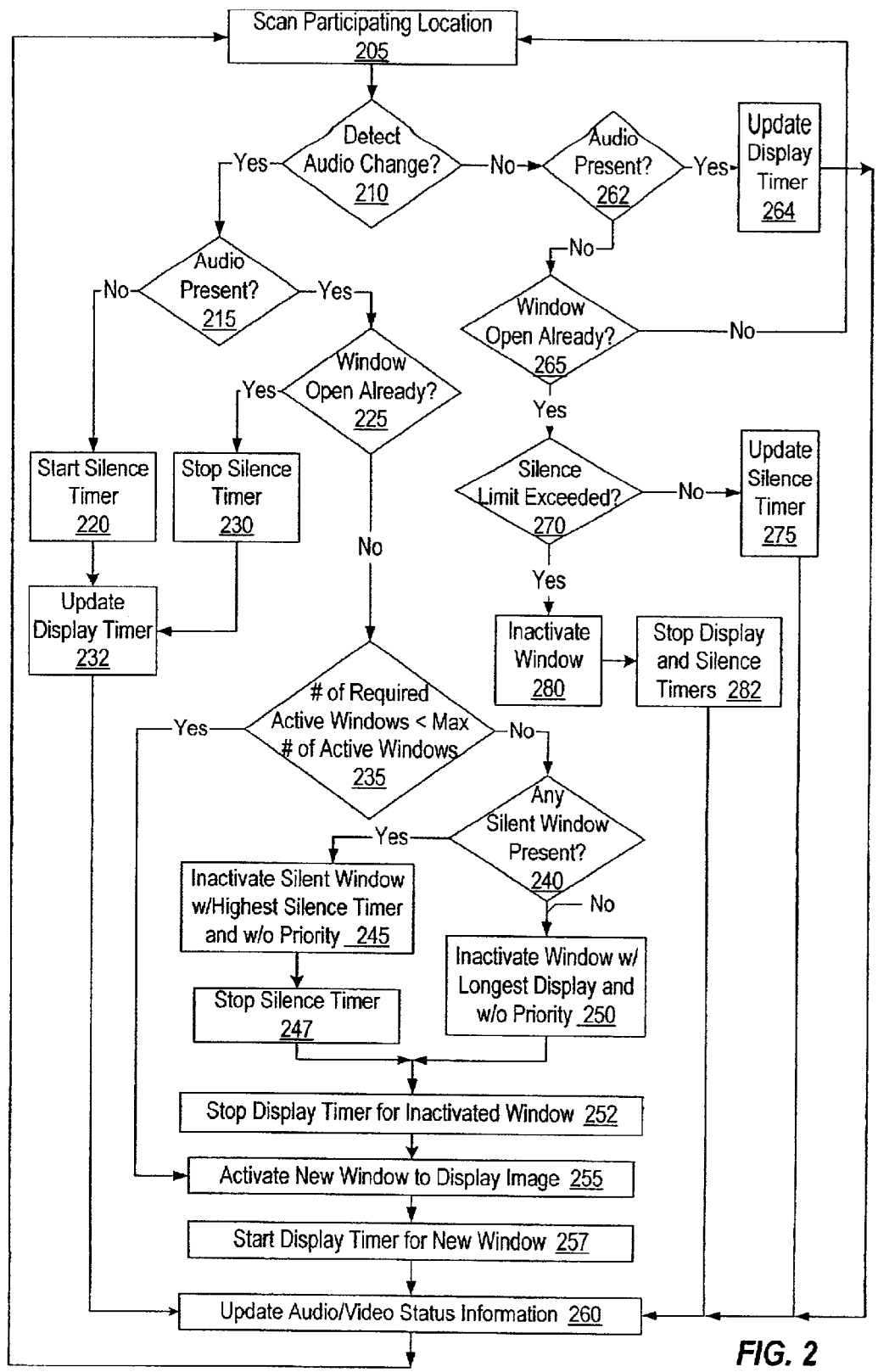
FIG. 2 is a flowchart of a method for displaying images to participating locations in a multi-point video conference.

FIG. 2 shows a flowchart of a method for displaying images to participants in a multi-point video conference. In Scan Participating Location step 205, an audio signal detecting device at one participating location is scanned to detect a change in the audio signal associated with the participating location. For example, Audio Presence Detection Module 120 of FIG. 1 may scan each audio signal detecting device at each participating location.

A change in the audio signal from a participating location includes a change from audible to silent or a change from silent to audible. A change in the audio signal may also be described as a change from having an audio presence to being absent (having no audio presence) or from being absent to having an audio presence. The scanning is preferably performed at frequent intervals, such as every two seconds, so that the display windows for the video conference terminals participating in the video conference accurately display images of the participants that are currently speaking. Images are broadcast such that images corresponding to each participating location are displayed substantially simultaneously at all participating locations in the multi-point conference. The flowchart of FIG. 2 can be repeated for each participating location in the video conference.

If an audio change for the participating location is detected at Detect Audio Change decision point 210, the nature of the change may result in a change to the status of the image for the participating location. For example, an image for the participating location may be either displayed or removed from display in the active display windows for the video conference. Control proceeds to Audio Present decision point 215.

If at Audio Present decision point 215, no audio signal is currently present, indicating that the participating location switched from audible to silent, control proceeds to Start Silence Timer step 220. A silence timer for the now-silent participating location is started. Control then proceeds to Update Display Timer step 232 to update a display timer for the participating location. Control then proceeds to Update Audio/Video Status Information step 260, where audio/video status information 130 of FIG. 1 is updated to indicate that the associated participating location is now silent. This updating can be performed by, for example, Audio Presence Detection Module 120 of FIG. 1.

If at Audio Present decision point 215, an audio signal is currently present, indicating that the participating location switched from silent to audible, control proceeds to Window Open Already decision point 225.

At Window Open Already decision point 225, if a display window associated with the now-audible participating location is already open, control proceeds to Stop Silence Timer step 230. The silence timer is stopped because the now-audible participating location is no longer silent. Control then proceeds to Update Display Timer step 232 to update a display timer for the participating location. Control then proceeds to Update Audio/Video Status Information step 260, where audio/video status information 130 of FIG. 1 is updated to indicate that the associated participating location is audible. This updating can be performed by, for example, Audio Presence Detection Module 120 of FIG. 1.

At Window Open Already decision point 225, if a display window associated with the now-audible participating location is not already open, an active display window in which the image associated with the participating location will be opened. Control proceeds to # of Required Active Windows<Max # of Active Windows decision point 235 to arrange the opening of an active window for this now-audible participating location.

At # of Required Active Windows<Max # of Active Windows decision point 235, a module such as video display decision-making module 140 of FIG. 1 determines which video images are to be displayed. If the number of required active windows to display all audible participating locations is less than the maximum number of active windows, a new active display window can be opened to accommodate the newly audible participating location. Control proceeds to Activate New Window to Display Image step 255.

At # of Required Active Windows<Max # of Active Windows decision point 235, if the number of required active windows to display all audible participating locations is not less than the maximum number of active windows, all active windows that can be activated are already open. Therefore, an active window that can be inactivated must be identified so that a new active window can be opened to display the newly-audible participating location. Control proceeds to Any Silent Window Present decision point 240.

At Any Silent Window Present decision point 240, a determination is made whether any of the active windows is now silent. If so, control proceeds to Inactivate Silent Window with Highest Silence Timer Value and without Priority step 245. The silent window that has been silent for the longest period is inactivated as long as the corresponding participating location does not have priority. When a window has priority, the corresponding participating location has been designated as a priority location from which an image is continuously displayed, and therefore the window should not be inactivated. When the silent window is inactivated, control proceeds Stop Silence Timer step 247 to stop the silence time associated with the participating location corresponding to the silent window. Control then proceeds to Stop Display Timer for Inactivated Window step 252 to stop a display timer for the silent window.

If at Any Silent Window Present decision point 240, none of the active windows is now silent, control proceeds to Inactivate Window with the Longest Display and without Priority step 250. The window in which an image of a given participating location has been displayed the longest is inactivated as long as the corresponding participating location does not have priority. When the longest-displayed window is inactivated, control proceeds to Stop Display Timer for Inactivated Window step 252 to stop a display timer for the inactivated window.

From Stop Display Timer for Inactivated Window, control proceeds to Activate New Window to Display Image step 255 to activate a new window to display the new image. At Activate New Window to Display Image step 255, a new active window is created in which to display an image associated with the participating location for which an audio change was detected. Displaying an image includes displaying a set of frames showing an image of an object or a participating location in the video conference over a period of time. Preferably the image is synchronized with the audio stream such that a speaker at the participating location appears to be speaking live. When the new window is activated, bandwidth originally allocated for the inactivated window can be used by the newly activated window. Control then proceeds to Start Display Timer step 257 to start a timer to track the amount of time that the window containing the associated participating location has been displayed. Control then proceeds to Update Audio/Video Status Information step 260, where audio/video status information 130 of FIG. 1 is updated to indicate that the associated participating location is now displayed in an active window. This updating can be performed by, for example, video display decision-making module 140 of FIG. 1.

From Update Audio/Video Status Information step 260, control returns back to Scan Participating Location step 205, where another participating location is scanned to detect whether an audio change has occurred. Preferably, the steps in the flowchart of FIG. 2 are performed so that all participating locations in the video conference can be scanned within a very short time interval, such as every two seconds.

If no audio change is detected at Detect Audio Change decision point 210, it is nevertheless possible that an active window should be inactivated because it has exceeded its silence timer limit. For example, active windows that are silent for lengthy periods of time can be inactivated in order to conserve bandwidth for the video conference. Control proceeds to Audio Present decision point 262.

If audio is detected at Audio Present decision point 262, an active window for that participating location should be already open. Control proceeds to Update Display Timer step 264 to update the display timer value and to Update Audio/Video Status Information step 260 to update audio/video status information such as Audio/Video Status Information 130 of FIG. 1.

If no audio is detected at Audio Present decision point 262, it is possible that an active window corresponding to that participating location is still open. Control proceeds to Window Open Already decision point 265.

If at Window Open Already decision point 265, no window for the participating location is open and no audio change occurred, then control proceeds back to Scan Participating Location step 205.

If at Window Open Already decision point 265, a window for the participating location is open, then control proceeds to Silence Limit Exceeded decision point 270. An example of a silence limit is one minute. If a window has been silent for the silence limit, the window can be inactivated (i.e., closed) to conserve the bandwidth that is necessary to display the associated video image.

If at Silence Limit Exceeded decision point 270, the silence limit is not exceeded, the silence timer is updated in Update Silence Timer step 275. The silence timer may be stored along with audio/video status information 130, or the silence timer value may be stored separately. When the silence timer is updated, control proceeds to Update Audio/Video Status Information step 260 to update audio/video status information such as Audio/Video Status Information 130 of FIG. 1.

If at Silence Limit Exceeded decision point 270, the silence limit is exceeded, the active window is inactivated in order to conserve bandwidth in Inactivate Window step 280. Bandwidth that had been allocated for the inactivated window can be freed. When the active window is inactivated, control proceeds to Stop Display and Silence Timers step 282 to update the display and silence timers for the participating location associated with the inactivated window. Control proceeds to Update Audio/Video Status Information step 260, where audio/video status information 130 of FIG. 1 is updated to indicate that the display window is no longer active.

The method illustrated in FIG. 2 is one example of an embodiment for providing fairness and rotation among participating locations in a multi-point video conference. Silence timers and display timers are used in this embodiment, although other means of determining fairness are within the scope of the method.

Multi-point video conferencing system 100 may be implemented using, for example, one or more information handling systems of any appropriate design. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

An information handling system typically includes a system unit having a system processor and associated volatile and non-volatile memory, one or more display monitors and keyboards, one or more diskette drives, one or more fixed disk storage devices and one or more printers. These information handling systems are typically designed to provide computing power to one or more users, either locally or remotely. Such a information handling system may also include one or a plurality of input/output (I/O) devices (i.e., peripheral devices) which are coupled to the system processor and which perform specialized functions. Examples of I/O devices include modems, sound and video devices, and specialized communication devices. Mass storage devices such as hard disks, CD-ROM drives and magneto-optical drives may also be provided, either as an integrated or peripheral device. One such example information handling system is shown in detail in FIG. 3.

Figure 3:
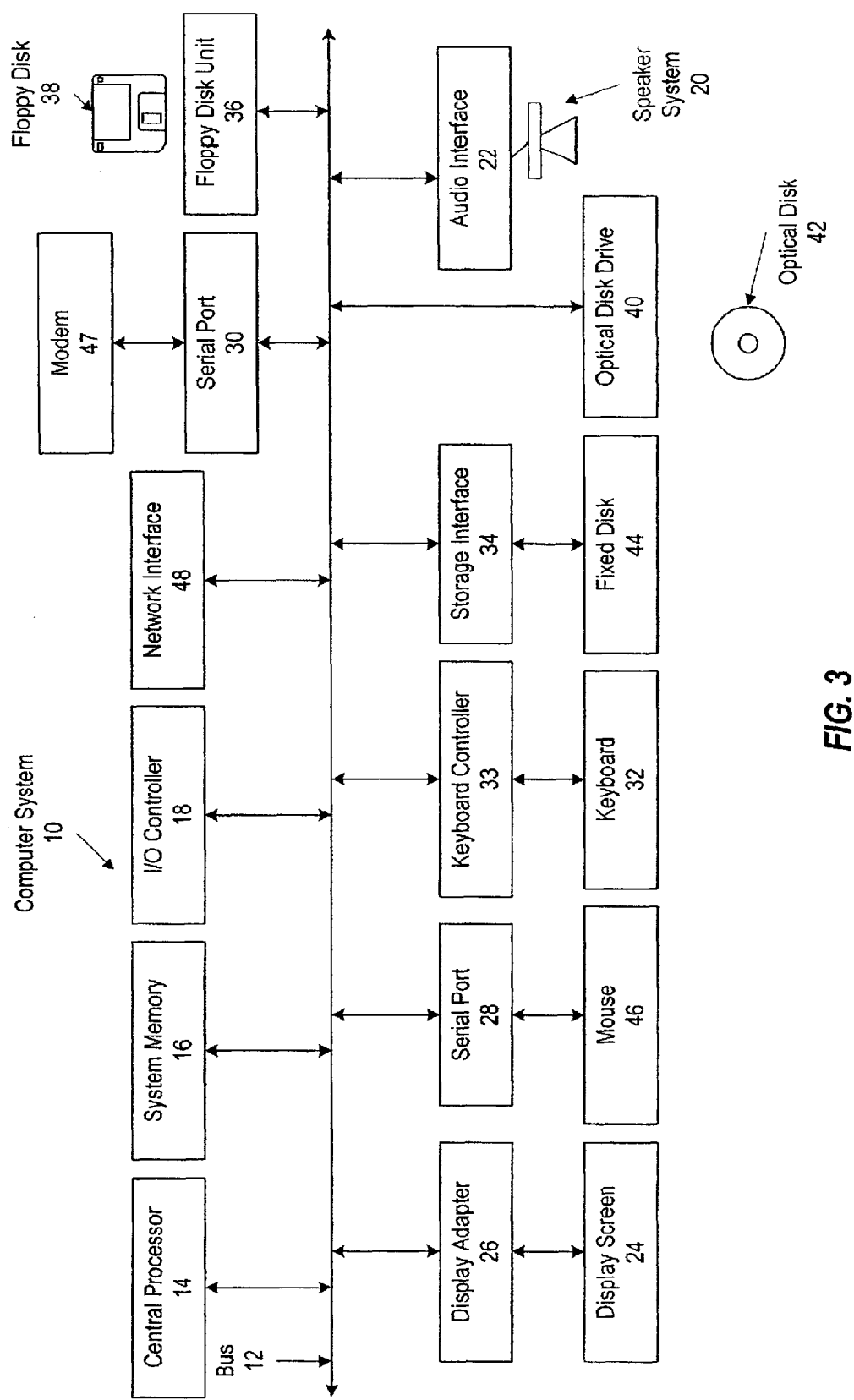
FIG. 3 is an example of an information handling system used to implement one embodiment of the invention.

FIG. 3 depicts a block diagram of an information handling system 10 suitable for implementing the present invention. Information handling system 10 includes a bus 12 which interconnects major subsystems of information handling system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk unit 36 operative to receive a floppy disk 38, and an optical disk drive 40 operative to receive an optical disk 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Application programs resident with information handling system 10 are generally stored on and accessed via a computer readable medium, such as a hard disk drive (e.g., fixed disk 44), an optical drive (e.g., optical disk drive 40), floppy disk unit 36 or other storage medium. Additionally, application programs may be in the form of electronic signals modulated in accordance with the application and data communication technology when accessed via network modem 47 or interface 48.

Storage interface 34, as with the other storage interfaces of information handling system 10, may connect to a standard computer readable medium for storage and/or retrieval of information, such as a fixed disk drive 44. Fixed disk drive 44 may be a part of information handling system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence). Network interface 48 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 3 to be present to practice the present invention. The devices and subsystems may be interconnected in different ways from that shown in FIG. 3. The operation of an information handling system such as that shown in FIG. 3 is readily known in the art and is not discussed in detail in this application. Code to implement the present invention may be stored in computer-readable storage media such as one or more of system memory 16, fixed disk 44, optical disk 42, or floppy disk 38. Additionally, information handling system 10 may be any kind of computing device, and so includes a personal data assistants (PDA), network appliance, X-window terminal or other such computing device. The operating system provided on information handling system 10 may be MS-DOS®, MS-WINDOWS®, OS/2®, UNIX®, Linux® or other known operating system. Information handling system 10 also may support a number of Internet access tools, including, for example, an HTTP-compliant web browser having a JavaScript interpreter, such as Netscape Navigator®, Microsoft Explorer® and the like.

Multiple information handling systems such as information handling system 10 may communicate via a network (not shown). Preferably, Video Display Decision-Making Module 140 resides on an information handling system in the network that is in communication with each of the other information handling systems and video conference, terminals. Similarly, Audio Presence Detection Module 120 resides on an information handling system that is in communication with each audio signal detection device and each video conference terminal such as video conference terminals 105a–105d of FIG. 1.

Regarding the signals described herein, those skilled in the ail will recognize that a signal may be directly transmitted from a first block to a second block, or a signal may be modified (e.g., amplified, attenuated, delayed, latched, buffered, inverted, encrypted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The multi-point video conferencing system and method of the present invention provide the ability to manage bandwidth allocated and images presented in multiple display windows for a multi-point video conference. The system and method provide fair coverage of all participating locations in an interactive discussion and minimize the bandwidth necessary to conduct the video conference. The system and method also maintain high quality, synchronized sound and images. Furthermore, the system and method do not require specialized equipment at each participating location to view images for the video conference.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing described embodiment shows different components contained within other components (e.g., the various elements shown as components of information handling system 10). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of a fully functional information handling system, however those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links, as well as media storage and distribution systems developed in the future.

The above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within an information handling system memory to configure the information handling system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the spirit and scope of the invention.

Consequently, the invention is intended to be limited only by the spirit and scope of the appended claims, giving full cognizance to equivalents in all respects.

What is claimed is:

1. A method comprising:

detecting an audio signal corresponding to a first participating location of a plurality of
      participating locations in a multi-point video conference, wherein
      the first participating location has no corresponding active display window, and
      the first participating location corresponds to an image;
   when a number of active display windows is less than a maximum number of the active display windows,
      activating a first active display window, and
      displaying the image in the first active display window to each participating location;
   and
   when the number of active display windows is not less than the maximum number,
      inactivating a second active display window,
      activating a third active display window, and
      displaying the image in the third active display window to each participating location.

2. The method of claim 1 further comprising:

broadcasting the audio signal to each participating location.

3. The method of claim 1 wherein the activating the first active display window comprises allocating first bandwidth for the first active display window; and
   the activating the third active display window comprises using second bandwidth allocated for the second active display window.

4. The method of claim 1 wherein the second active display window occupies a first position among the active display windows; and
   the third active display window occupies a second position among the active display windows.

5. The method of claim 1 wherein each active display window of the active display windows is visible substantially simultaneously at each participating location.

6. The method of claim 1 further comprising:
selecting the second active display window according to a length of time that the second active display window has been displayed.

7. The method of claim 1 further comprising:
selecting the second active display window according to a length of time that a second audio signal corresponding to the second active display window has been silent.

8. The method of claim 1 further comprising:
selecting the second active display window from a subset of the active display windows, wherein
the subset excludes a host active display window of the active display windows, the host active display window displaying a host participating location of the participating locations;
the subset excludes a priority active display window of the active display windows, the priority active display window displaying a priority participating location of the participating locations; and
the selecting precedes the inactivating.

9. The method of claim 1 further comprising:
selecting the second active display window from a subset of the active display windows, wherein
the selecting precedes the inactivating.

10. The method of claim 1 further comprising:
selecting the second active display window from a subset of the active display windows, wherein
the subset excludes a host display window of the active display windows, the host display window displaying a host participating location of the participating locations; and
the selecting precedes the inactivating.

11. The method of claim 1 further comprising:
selecting the second active display window from a subset of the active display windows, wherein
the subset excludes a priority display window of the active display windows, the priority display window displaying a priority participating location of the participating locations; and
the selecting precedes the inactivating.

12. The method of claim 1 further comprising:
displaying an existing image in an existing active display window of the active display windows substantially simultaneously with the displaying the image in one of the first active display window and the third active display window.

13. The method of claim 1 further comprising:
determining the maximum number of the active display windows from a limited bandwidth available for the multi-point video conference.

14. A method comprising:
detecting a change in audio status corresponding to a first participating location of a plurality of participating locations in a multi-point video conference;
when the change in audio status is from silent to audible, and
when a number of active display windows is less than a maximum number of the active display windows,
activating a first active display window;
starting a first display timer corresponding to the first active display window; and
displaying the image in the first active display window to each participating location;
and
when the change in audio status is from silent to audible, and
when the number of active display windows is not less than the maximum number,
inactivating a second active display window;
stopping a second display timer corresponding to the second active display window;
activating a third active display window;
starting a third display timer corresponding to the third active display window; and
displaying the image in the third active display window to each participating location;
and
when the change in audio status is from audible to silent, starting a first silence timer corresponding to the first participating location.

15. The method of claim 14 further comprising:
broadcasting the audio signal to each participating location.

16. The method of claim 14 wherein
the activating the first active display window comprises allocating first bandwidth for the first active display window; and
the activating the third active display window comprises using second bandwidth allocated for the second active display window.

17. The method of claim 14 wherein
the inactivating the second active display window is performed according to one of a group consisting of the following:
a second silence timer indicating a first length of time that a second participating location corresponding to the second active display window has been silent, and
a second display timer indicating a second length of time that the second active display window has been displayed.

18. The method of claim 14 further comprising:
selecting the second active display window when the first length of time corresponds to a highest silence timer value of a plurality of silence timer values.

19. The method of claim 14 further comprising:
selecting the second active display window when the second length of time corresponds to a highest display timer value of a plurality of display timer values.

20. A method comprising:
detecting a change in audio status corresponding to a first participating location of a plurality of participating locations in a multi-point video conference;
when the change in audio status is from silent to audible, and
when a number of active display windows is less than a maximum number of the active display windows,
activating a first active display window,
starting a first display timer corresponding to the first active display window, and
displaying the image in the first active display window to each participating location;
and
when a number of active display windows is not less than a maximum number of active display windows,
inactivating a second active display window according to one of a group consisting of the following:
a second silence timer indicating a first length of time that the second active display window has been silent, and
a second display timer indicating a second length of time that the second active display window has been displayed;

activating a third active display window;
   starting a third display timer corresponding to the third active display window; and
   displaying the image in the third active display window to each participating location;
and
when the change in audio status is from audible to silent, starting a first silence timer corresponding to the first participating location.

21. The method of claim 20 further comprising:
broadcasting the audio signal to each participating location.

22. The method of claim 20 wherein
the activating the first active display window comprises allocating first bandwidth for the first active display window; and
the activating the third active display window comprises using second bandwidth allocated for the second active display window.

23. The method of claim 20 further comprising:
selecting the second active display window when the first length of time corresponds to a highest silence timer value of a plurality of silence timer values.

24. The method of claim 20 further comprising:
selecting the second active display window when the second length of time corresponds to a highest display timer value of a plurality of display timer values.

25. A multi-point video conferencing system comprising:
detecting means for detecting an audio signal corresponding to a first participating location of a plurality of participating locations in a multi-point video conference, wherein
   the first participating location has no corresponding active display window, and
   the first participating location corresponds to an image;
first displaying means for, when a number of at least one active display window is less than a maximum number of the at least one active display window,
   activating a first active display window, and
   displaying the image in the first active display window;
and
second displaying means for, when the number of the at least one active display window is not less than the maximum number,
   inactivating a second active display window;
   activating a third active display window; and
   displaying the image in the third active display window.

26. The multi-point video conferencing system of claim 25 further comprising:
broadcasting means for broadcasting the audio signal to each participating location.

27. The multi-point video conferencing system of claim 25 wherein
the first displaying means further comprise bandwidth allocating means for allocating first bandwidth for the first active display window; and
the second displaying means further comprise bandwidth using means for using second bandwidth allocated for the second active display window.

28. The multi-point video conferencing system of claim 25 wherein
each active display window of the active display windows is visible substantially simultaneously at each participating location of the participating locations.

29. The multi-point video conferencing system of claim 25 further comprising:
selecting means for selecting the second active display window according to a length of time that the second active display window has been displayed.

30. The multi-point video conferencing system of claim 25 further comprising:
selecting means for selecting the second active display window according to a length of time that an audio signal corresponding to the second active display window has been silent.

31. The multi-point video conferencing system of claim 25 further comprising:
selecting means for selecting the second active display window from a subset of the active display windows, wherein
   the subset excludes a host active display window of the active display windows, the host active display window displaying a host participating location of the participating locations;
   the subset excludes a priority active display window of the active display windows, the priority active display window displaying a priority participating location of the participating locations; and
   the selecting precedes the inactivating.

32. An information handling system comprising:
a processor; and
a memory comprising instructions executable by the processor, wherein
   the information handling system is configured to communicate with a plurality of audio signal detecting devices, a corresponding audio signal detecting device for each participating location of a plurality of participating locations;
   the information handling system is further configured to communicate with a plurality of display devices, a respective display device for each participating location of a set of the participating locations; and
   the instructions comprise:
      detecting instructions to detect an audio signal corresponding to a first participating location of the participating locations, wherein
         the detecting is performed by a first audio signal detecting device of the audio signal detecting devices,
         the first participating location has no corresponding active display window, and
         the first participating location corresponds to an image;
      first displaying instructions to, when a number of active display windows is less than a maximum number of the active display windows,
         activate a first active display window, and
         display the image in the first active display window on each display device of the display devices;
      and
      second displaying instructions to, when the number of the active display windows is not less than the maximum number,
         inactivate a second active display window;
         activate a third active display window; and
         display the image in the third active display window on each display device of the display devices.

33. The information handling system of claim 32 wherein
the first displaying instructions further comprise bandwidth allocating instructions to allocate first bandwidth for the first active display window; and
the second displaying instructions further comprise bandwidth using instructions to use second bandwidth allocated for the second active display window.

34. The information handling system of claim 32 wherein the instructions further comprise:
broadcasting instructions to broadcast the audio signal to each participating location.

35. The information handling system of claim 32 wherein the first displaying instructions and the second displaying instructions are configured so that each active display window of the active display windows is visible substantially simultaneously on each display device of the display devices at each participating location of the participating locations.

36. The information handling system of claim 32 wherein the instructions further comprise:
selecting instructions to select the second active display window according to a length of time that the second active display window has been displayed.

37. The information handling system of claim 32 wherein the instructions further comprise:
selecting instructions to select the second active display window according to a length of time that a second audio signal corresponding to the second active display window has been silent.

38. The information handling system of claim 32 wherein the instructions further comprise:
selecting instructions to select the second active display window from a subset of the active display windows, wherein
the subset excludes a host active display window of the active display windows, the host active display window displaying a host participating location of the participating locations;
the subset excludes a priority active display window of the at least one active display window, the priority active display window displaying a priority participating location of the participating locations; and
the selecting precedes the inactivating.

39. A computer program product comprising:
detecting instructions to detect an audio signal corresponding to a first participating location of a plurality of participating locations in a multi-point video conference, wherein
the first participating location has no corresponding active display window, and
the first participating location corresponds to an image;
first displaying instructions to, when a number of active display windows is less than a maximum number of the active display windows,
activate a first active display window, and
display the image in the first active display window; and
second displaying instructions to, when the number of the active display windows is not less than the maximum number,
inactivate a second active display window;
activate a third active display window; and
display the image in the third active display window.

40. The computer program product of claim 39 wherein the instructions further comprise:
broadcasting instructions to broadcast the audio signal to each participating location.

41. The computer program product of claim 39 wherein
the first displaying instructions further comprise bandwidth allocating instructions to allocate first bandwidth for the first active display window; and
the second displaying instructions further comprise bandwidth using instructions to use second bandwidth allocated for the second active display window.

42. The computer program product of claim 39 wherein the first displaying instructions and the second displaying instructions are configured so that each active display window of the active display windows is visible substantially simultaneously at each participating location.

43. The computer program product of claim 39 further comprising:
selecting instructions to select the second active display window according to a length of time that the second active display window has been displayed.

44. The computer program product of claim 39 further comprising:
selecting instructions to select the second active display window according to a length of time that a second audio signal corresponding to the second active display window has been silent.

45. The computer program product of claim 39 further comprising:
selecting instructions to select the second active display window from a subset of the active display windows, wherein
the subset excludes a host active display window of the active display windows, the host active display window displaying a host participating location of the participating locations;
the subset excludes a priority active display window of the active display windows, the priority active display window displaying a priority participating location of the participating locations; and
the selecting precedes the inactivating.

* * * * *